United States Patent [19]

Miller

[11] 4,370,857
[45] Feb. 1, 1983

[54] PNEUMATIC SYSTEM FOR COMPRESSED AIR DRIVEN VEHICLE

[76] Inventor: Terry R. Miller, Box 80, Crestline, Kans. 66728

[21] Appl. No.: 167,524

[22] Filed: Jul. 11, 1980

[51] Int. Cl.³ .......................................... F60D 31/02
[52] U.S. Cl. ...................................... 60/413; 91/188; 180/165; 180/215; 180/302
[58] Field of Search ...................... 180/302, 165, 215; 60/414, 370, 371, 374, 413; 91/152, 153, 159, 188, 236, 237, 239

[56] References Cited

U.S. PATENT DOCUMENTS

| | | | |
|---|---|---|---|
| 1,383,661 | 7/1921 | Raspotnik | 180/302 |
| 2,307,544 | 1/1943 | Robinson | 60/374 |
| 3,693,351 | 9/1972 | Minkus | 60/370 |
| 3,765,180 | 10/1973 | Brown | 60/374 X |
| 3,980,152 | 9/1976 | Manor | 180/302 X |

Primary Examiner—Douglas C. Butler
Assistant Examiner—Donald W. Underwood
Attorney, Agent, or Firm—Harvey B. Jacobson

[57] ABSTRACT

An air driven vehicle utilizes pressurized air contained in storage tanks for actuating double-acting cylinders which in turn transmit a driving force to an axle of the vehicle. The compressed air in a first air tank under high pressure is fed to a first actuating cylinder so as to drive a crank which operates a main drive gear in communication with an axle gear attached to the vehicle axle. Upon a reversal of movement of the piston contained in the first actuating cylinder, a supply of exhaust air is directed from the cylinder to a second air pressure tank in which the exhaust air is collected under a lower pressure than the air contained in the first air pressure tank. The exhaust air is prevented from flowing back into the first actuating cylinder through the use of a one-way check valve, and the pressurized exhaust air in the second pressure tank may then be used to impart a driving force to a second actuating cylinder attached to the same crank so as to provide a supplementary force to the main drive gear in propelling the vehicle. The air exhausted from the second actuating cylinder during the return stroke of a piston in the cylinder may then be similarly employed to drive even additional actuating cylinders or may be exhausted to the atmosphere.

5 Claims, 8 Drawing Figures

PNEUMATIC SYSTEM FOR COMPRESSED AIR DRIVEN VEHICLE

BACKGROUND OF THE INVENTION

1. Field of the Invention

The present invention relates to air-driven vehicles and more particularly pertains to pneumatic system for propelling a compressed airdriven vehicle which utilizes a first source of compressed air to operate a first actuating cylinder operable to propel the vehicle and which utilizes the exhaust air from the first actuating cylinder as a source of compressed air to operate a second actuating cylinder which supplements the driving force of the first actuating cylinder.

2. Description of the Prior Art

In the field of air driven vehicles, it has been the general practice to employ a source of compressed air to operate an air actuating cylinder which through its operation propels the vehicle. Such devices have generally proven to be unsatisfactory in operation due to the gross inefficiency associated therewith. Specifically, the tremendous weight involved in the construction of these vehicles, as well as the large amount of compressed air required to propel these vehicles even for a short distance, has made the construction of the same an impractical matter. Many of the problems associated with air vehicle construction have revolved around the fact that a tremendous amount of compressed air is necessary for each rotation of a drive shaft, and as such, those concerned with the development of air-driven vehicles have long recognized the need for either decreasing the amount of compressed air required for any single revolution of a drive shaft or, in the alternative, making more efficient use of the amount of compressed air being employed.

Accordingly, the development of air-driven vehicles has been a slow process and to date, these vehicles have not been regularly employed as a means of transportation, although they apparently were conceived as far back as in the late 19th century. For example, U.S. Pat. No. 331,276, issued Dec. 1, 1885, to Buell, discloses a tricycle having an engine operable by compressed air attached thereto so as to provide a propelling force to the tricycle. In this respect, cylinders of compressed air were illustrated as being operably connected to cranks associated with the tricycle axle by means of air actuated cylinders. However, no mention of, or provision for, a further use of the actuating air being exhausted from the actuating cylinders is made. Similarly, U.S. Pat. No. 589,710, issued Sept. 7, 1897, to Flucks, discloses the use of compressed air or other compressed fluid being conveyed to drive wheels so as to impart movement to a carriage. As with the Buell device, the propelling compressed air is used but one time to impart its driving force and then is exhausted to the atmosphere.

In that the above-discussed compressed air vehicles were totally impractical, a number of attempts have evolved to make more efficient use of the compressed air employed as the driving medium, as well as to provide supplementary propelling forces for use in conjunction with the drive-imparting compressed air. For example, U.S. Pat. No. 3,704,760, issued Dec. 5, 1972, to Maruyama, discloses a propelling system for vehicles utilizing both an air driven motor and an electric motor. the air driven motor is operated by air supplied under pressure from a source of compressed air, such as a cylinder or a liquid-air tank, while the electric motor is driven by a storage battery in which stored electrical energy produced by a generator may assist in the propelling of the vehicle. In this respect, the generator is allegedly driven by a turbine operated by the air supplied under pressure from the source of compressed air, while both the air driven motor and the electric motor are connected to transmission means linked to the driving wheels of the vehicle. In this respect, the Maruyama propelling system utilizes the compressed air to both drive the vehicle and to generate electricity for also driving the vehicle. As can be appreciated, an even greater supply of compressed air would be needed than with a vehicle driven exclusively by compressed air, and accordingly, the problems of vehicle weight and reduction of compressed air requirements are not solved by this construction. Further, no suggestion or teaching is present regarding the use of exhausted compressed air as a source of further energy to propel the vehicle.

U.S. Pat. No. 3,847,058, issued Nov. 12, 1974, to Manor, is even more representative of the many futile attempts to develop an efficient air powered vehicle. In this respect, Manor discloses a vehicle having an air powered engine which utilizes a first reservoir of gaseous fluid under pressure connected to an intake system for operating the engine. A second reservoir is connected to an exhaust system for receiving the spent air, and a suspension-type compressor is operatively connected between a wheel and the chassis whereby relative vertical motion between the wheel and the chassis will cause operation of the compressor. Further, additional compressors are operated primarily from air flow induced by forward motion of the vehicle, and the air from all of the aforementioned compressors is then redirected through the system to again power the vehicle. In effect, the vehicle described therein is exceedingly complex and is apparently directed toward a vehicle which would effectively power itself. At the same time, the exhaust air from the actuating cylinder is not utilized to drive a second separate actuating cylinder, and along the same line of reasoning, the compressed air deliverable to the actuating cylinder is used only one time for imparting a propelling force to the vehicle before it is returned to a storage tank for reuse.

Similarly, U.S. Pat. No. 3,925,984, issued Dec. 16, 1975, to Holleyman, discloses a compressed air power plant for use on a vehicle which utilizes the compressed air to operate actuating cylinders for providing the propelling force necessary to drive the vehicle. The vehicle is further provided with a compressor which is battery operated and which serves to continually supply compressed air to storage tanks so that the vehicle effectively never runs out of compressed air for propulsion, but is limited in its operation only by the extent of the power supplied by the batteries. In other words, once the batteries are expended, the compressor ceases to function and the compressed air supply is exhausted. While this disclosed system may be somewhat practical in nature, it still does not make efficient use of the compressed air utilized, since no means are provided for obtaining energy from the exhausted air.

Along the same line of operation, there is disclosed in U.S. Pat. No. 3,765,180, issued Oct. 16, 1973, to Brown, a compressed air engine used in combination with an auxiliary air compressor for building up the pressure in a compressed air supply tank which feeds air through an engine control valve to the engine pistons. Upon reaching a minimum air pressure, an electric motor is cut off and the auxiliary compressor is simultaneously engaged with the crankshaft to continue to build up air pressure. Also provided is a main recycle air compressor for capturing and reusing exhausted air and supplying the same back to the compressed air supply tank. As can be appreciated, the Brown device relies on a plurality of compressors as part of the system, as well as an electrical supply for driving the same. Again, no mention is to be found of utilizing exhaust air as a compressed air supply for operating a second actuating cylinder. Further, it is readily apparent that vehicles utilizing concurrent supplies of electrical energy are by necessity of a much heavier construction due to the positioning and transporting of batteries, compressors, alternators, etc., thereon.

There has been at least one attempt to devise an operable system for utilizing exhaust air as an independent propulsion medium for operating additional actuating cylinders. In this respect, U.S. Pat. No. 3,666,038, issued May 30, 1972, to Hudspeth et al, discloses a system utilizing a pressure storage vessel for initially charging a first air cylinder of a series of air cylinders. Valve means are disclosed which admits a flow of pressurized air, in a sequential manner, into the cylinders for piston movement thereby to compress spring members to a loaded condition. Additional valve means, closed during downward piston movement, are subsequently actuated to permit dischage of an air impulse by action of the compressed springs combined with a second source of air pressure acting on the other side of the respective pistons. The last cylinder of the series is operable to impart a force to a media for the operation of a motor powering a vehicle. In this connection, only the last cylinder is used to impart a driving force to a vehicle, since the use of the difference size cylinders is strictly for the purpose of increasing pressure, and no use or suggestion is made to save exhaust air at a lower pressure to use again in another larger cylinder to obtain almost the same force each time the air is reused and to have each cylinder used so as to individually impart a driving force to the vehicle.

SUMMARY OF THE INVENTION

The general purpose of the present invention, which will be described subsequently in greater detail, is to provide for an air-driven engine that has all of the advantages of similarly employed prior art devices and has none of the above-described disadvantages. To obtain this, the present invention provides for a vehicle which is powered by at least two air operated double-acting actuating cylinders, such cylinders being operably connected to a main drive gear which is in turn meshed with an axle gear fixedly secured to an axle having driving wheels thereon. A high pressure air tank supplies air to an air timing valve which in turn directs the air to a first actuating cylinder thereby supplying a first source of propulsion to the main drive gear. The timing valve during spaced intervals directs the exhausted air being released from the first actuating cylinder to a pressure accumulator in the form of a low pressure supply tank for collection and compression therein. In this respect, a one-way check valve is provided in the line to the low pressure air tank so as to prevent the compressed air contained in the tank from flowing backward in a manifold to the air timing valve. Through the use of a second air timing valve, the compressed exhaust air contained in the low pressure air tank may be directed to a second larger actuating cylinder operated in 90° out-of-phase relation to cylinder 28 so as to present a second propulsion force to the main drive gear thereby to drive the vehicle. Once the air is exhausted from the second actuating cylinder, it may be directed to the atmosphere or, alternatively, it may be directed to even further supply tanks and actuating cylinders.

While the general operation of the present invention has been described, it should be noted that the first air timing valve is further operably connected to a vent valve which is cam operated and which serves to vent exhaust air coming from the first actuating cylinder to the atmosphere between the spaced intervals aforementioned. In this respect, the vent valve operates during those periods of time when the back pressure associated with the exhaust chamber would serve to disrupt the efficiency of the drive connection as related to the positioning of a crank throw associated with the drive shaft. In other words, the back pressure is tolerated during only those parts of the drive cycle when maximum torque and efficiency is available to the drive shaft containing the main drive gear so that the exhaust air back pressure does not seriously hamper the propulsion force being supplied to the drive wheels.

It is, therefore, an object of the present invention to provide a new and improved air-driven vehicle which has all of the advantages of the prior art and none of the disadvantages.

It is another object of the present invention to provide for an air driven vehicle which makes efficient use of its propelling compressed air supply.

A further object of the present invention is the provision of a lightweight air driven vehicle.

Still another object of the present invention is the provision of an air driven vehicle which utilizes exhaust air from a first driving cylinder as an actuating means for a second driving cylinder.

Yet another object of the present invention is the provision of a novel valve system which permits the capturing of some exhaust air from an actuating cylinder for use in propelling a second actuating cylinder and which further permits the release of some of the exhaust air to the atmosphere during parts of a driving cycle when the capturing of the exhaust air would present a back pressure problem affecting engine output.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
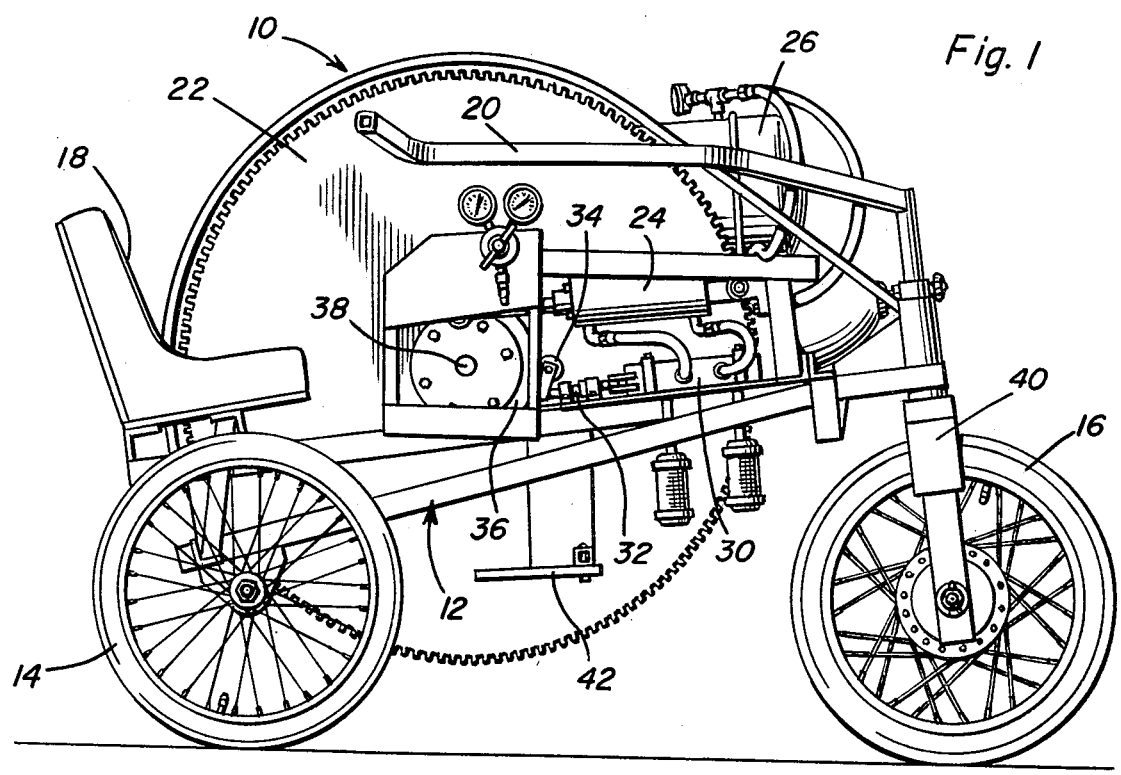
FIG. 1 is a right side elevation view of a preferred embodiment of the air-driven vehicle forming the present invention.

Referring now to the drawings and, in particular, to FIG. 1 wherein there is illustrated in perspective a right hand elevation view of the air-driven vehicle and pneumatic system associated therewith forming the present invention and generally designated by the numeral 10. In this respect, the vehicle 10 essentially comprises a vehicle frame 12 to which is connected a pair of driving wheels 14 and a front steering wheel 16 thereby forming a tricycle-type construction. A seat 18 is conventionally mounted to the vehicle frame 12 and is so positioned whereby an operator may be seated thereon in a manner providing easy access to the steering handle 20. The steering handle 20 is fixedly attached to the steering wheel 16 in a conventional manner whereby movement of the steering handle, which is similar to the handle bars found on a bicycle, is translated to the steering wheel 16 thereby to govern the direction of movement of the vehicle 10.

Also illustrated in FIG. 1 is the main drive gear 22, which is utilized to provide a driving force to the driving wheels 14, and the secondary double-acting actuating cylinder 24 which serves as one of two driving cylinders for operating the main drive gear. In this connection, the secondary actuating cylinder 24 is driven by compressed air supplied from a low pressure compressed air tank 26, such low pressure tank being supplied with the exhaust air from a primary double-acting actuating cylinder 28 (not illustrated in this figure). The air from the low pressure compressed air tank 26 is selectively directed to the secondary actuating cylinder 24 by means of a secondary air timing valve 30 which is operable in response to the reciprocable movement of a spool member 32 having a skate wheel or cam follower 34 attached thereto and engaging with a secondary cam 36. The seconday cam 36 is fixedly attached to a drive shaft 38 to which is also fixedly attached the main drive gear 22.

Other structural features mentionable with respect to the embodiment illustrated in FIG. 1 include a conventional shock absorber 40 associated with the steering wheel 16 and operably connected to the frame 12. Additionally, one of a pair of foot rests 42 is illustrated upon which an operator may position his feet during a driving of the vehicle 10.

Figure 2:
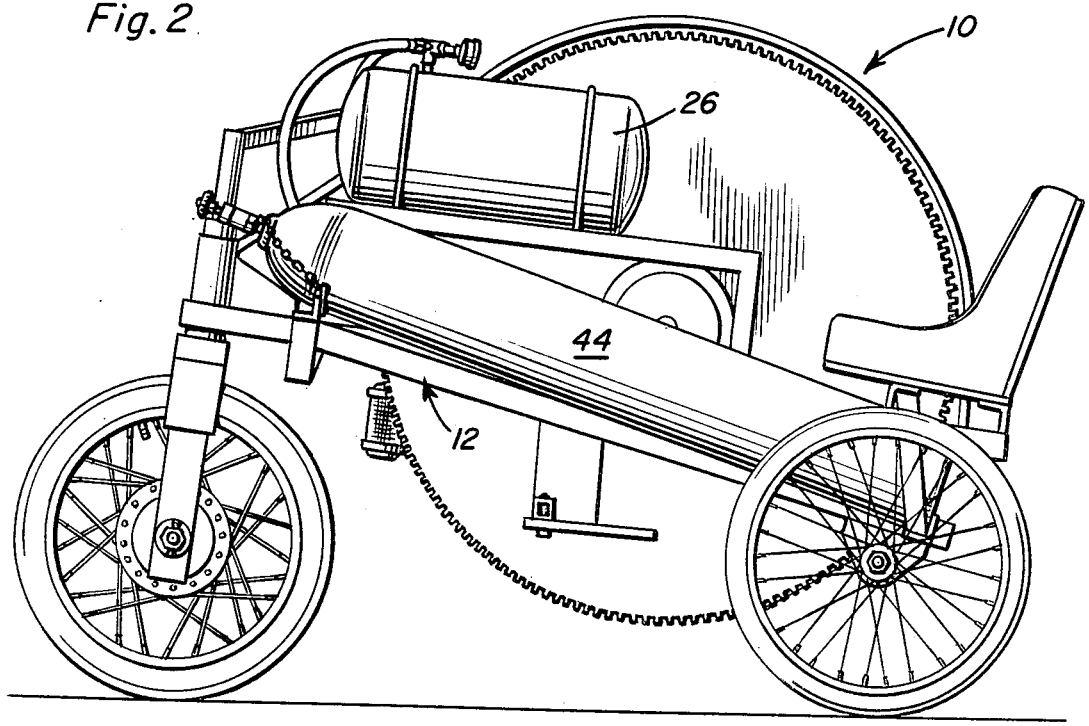
FIG. 2 is a left side elevation view of the air-driven vehicle illustrated in FIG. 1.

FIG. 2, which is a left side elevation view of the present invention as opposed to the right side elevation view illustrated in FIG. 1, shows the compressed air storage means utilized for propelling the air-driven vehicle 10. In this respect, a storage pressure source such as a high pressure compressed air tank 44 is shown fixedly attached to the frame 12, such high pressure compressed air tank supplying compressed air to the aforementioned primary double-acting actuating cylinder 28. Similarly, the low pressure compressed air tank 26 is shown mounted on the vehicle 10 in a position proximate to and above the high pressure compressed air tank 44. The low pressure compressed air tank 26 utilizes exhaust air from the primary double-acting actuating cylinder 28 and stores the same until use in the secondary double-acting actuating cylinder 24.

Figure 3:
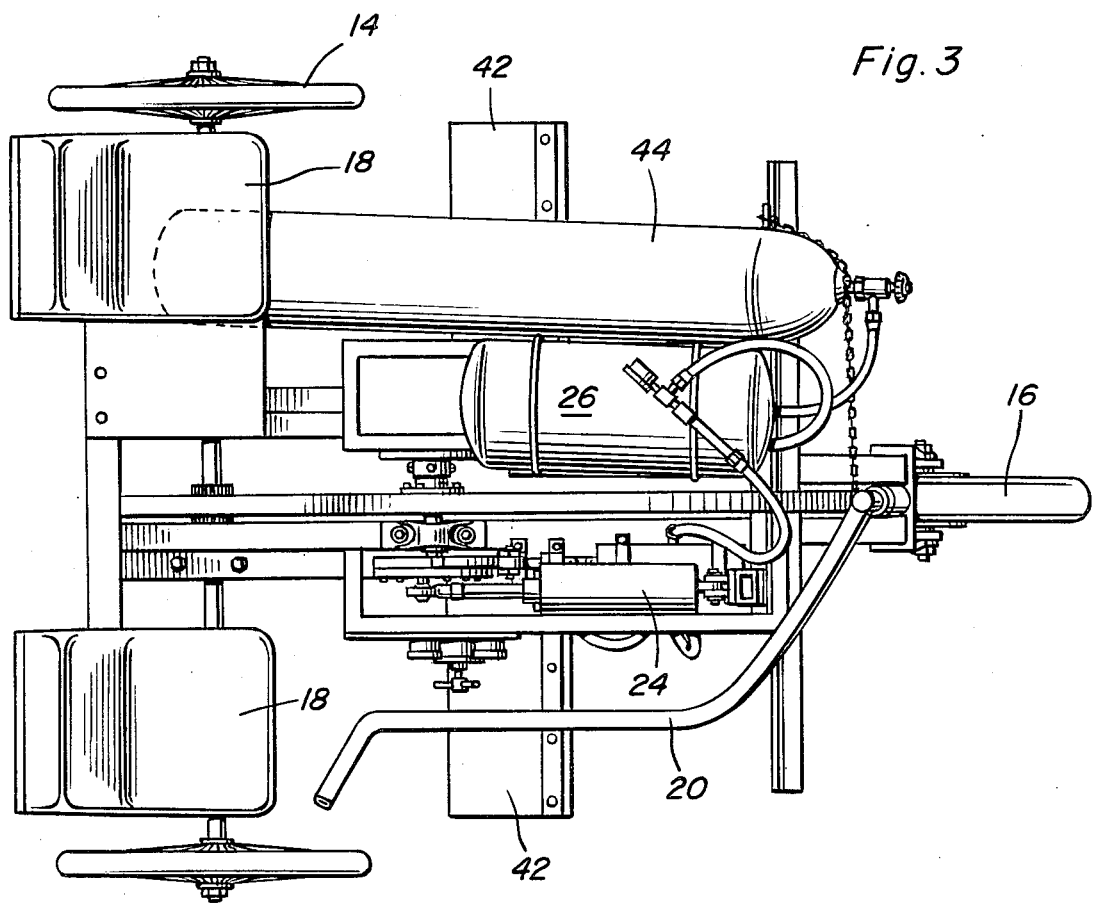
FIG. 3 is a top plan view of the air-driven vehicle illustrated in FIG. 1.

FIG. 3 further illustrates the general layout and structural configuration of the air-driven vehicle 10 by illustrating the same in terms of a top plan view. In this connectin, it can be seen that the vehicle may utilize a pair of seats 18 so as to accommodate two operators, while the operator on the right steers the vehicle by means of the steering handle 20 which controls movement of the steering wheel 16. As shown, the air-driven vehicle 10 is basically of a symmetrical construction with the high pressure compressed air tank 44 and the low pressure compressed air tank 26 being positioned on the non-steering side of the vehicle.

Figure 4:
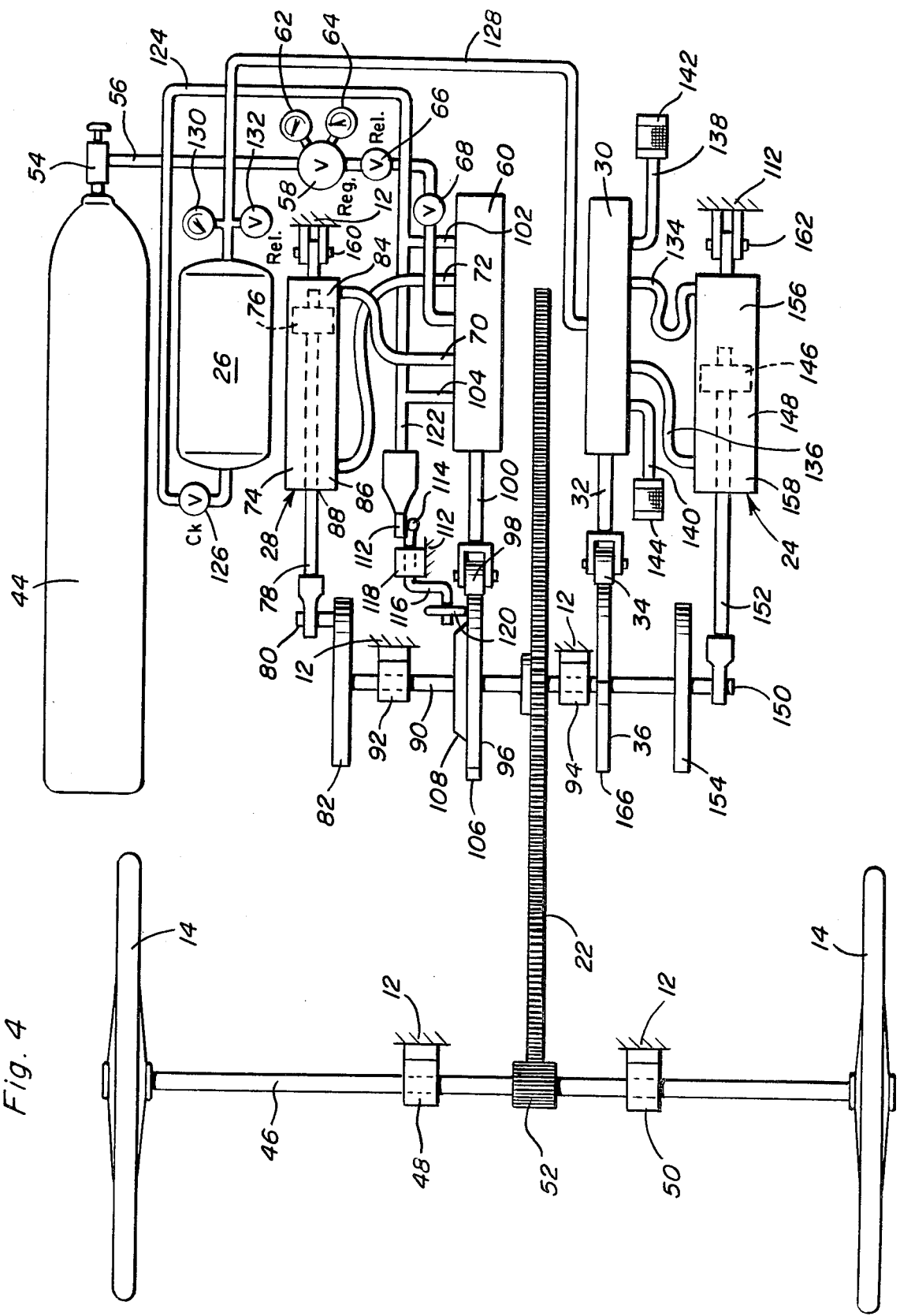
FIG. 4 is a schematic illustration of the pneumatic system employed in driving the air-driven vehicle shown in FIG. 1.

Reference is next made to FIG. 4, which is a schematic diagram of the pneumatic system utilized in operating the air-driven vehicle 10, whereby a first discussion may be presented regarding the method and means utilized for operating the present invention. In this respect, it can be seen that the drive wheels 14, as priorly discussed, are fixedly attached to the drive axle 46 which is in turn secured to the vehicle frame 12 by means of a pair of bearing supports 48, 50. A driving force may be imparted to the drive axle 46, and thus to the drive wheels 14 so as to propel the air-driven vehicle 10, through the use of an axle gear 52 concentrically aligned with and fixedly attached to the axle. As shown, the axle gear 52 is drivingly engaged with the main drive gear 22, and as can be appreciated, any movement of the main drive gear will be transferred to the axle gear 52 so as to propel the vehicle 10. Movement of the main drive gear 22 is effected through the use of the primary double-acting actuating cylinder 28 and the secondary double-acting actuating cylinder 24.

With respect to the initial structural layout illustrated in FIG. 4 and without a description of the operation thereof at this point of discussion, it can be seen that the high pressure compressed air tank 44 is provided with a faucet type valve 54 which controls the delivery of compressed air to a primary air manifold 56. The manifold 56 has a regulator 58 operably connected thereto, such regulator serving to regulate the pressure and amount of compressed air being supplied to a primary air timing valve 60. The regulator 58 includes an air tank pressure gauge 62, which indicates the pressure of the compressed air being supplied to the regulator from the high pressure compressed air tank 44, and a regulated air pressure gauge 64, which indicates the pressure of the compressed air leaving the regulator and being supplied to the primary air timing valve 60. Additionally, a safety release valve 66 is provided in the manifold 56 downstream of the regulator 58 so as to provide a means for venting the high pressure compressed air in the event of a failure of the regulator. Further, an on-off control valve 68 is provided in the manifold 56 which serves as a second means of cutting off the supply of compressed air from the high pressure air tank 44, the first means being the faucet valve 54.

Operably attached between the primary air timing valve 60 and the primary double-acting actuating cylinder 28 are a pair of conduits 70, 72 which serve to alternately supply and exhaust compressed air to and from the actuating cylinder. In this connection, the primary air timing valve 60 is a spool-type directional valve provided with four-way operation and being cam operated, such valves being well-known and commercially available.

The primary double-acting actuating cylinder 28 includes a cylinder housing 74 into which is positioned a drive piston 76. The piston 76 is provided with a connecting rod 78 which is rotatably attached to a ball joint or crank pin 80 provided on a crank 82. The drive piston 76 is sealingly positioned within the cylinder housing 74 in such a manner that air may be compressed on either side of the piston, i.e., either in the spaces 84 or 86. As such, the connecting rod 78 projects out of the cylinder housing 74 through an aperture 88 which is of substantially the same diameter of the connecting rod so as to provide an effective seal between the space 86 and the atmosphere.

The crank 82 is fixedly attached to a main power transmitting drive shaft 90, such shaft being rotatably supported from the vehicle frame 12 by a pair of bearings 92, 94 and further having the main drive gear 22 concentrically aligned with and fixedly attached thereto.

Also fixedly attached to the main drive gear shaft 90 is a primary air timing valve cam 96 which rotates concurrently with the shaft 90 and which is in operable engagement with a cam follower 98. The cam follower 98 is operably attached to a spool shaft 100, such spool shaft being reciprocable within the primary air timing valve 60 and serving to position the plurality of spool valves contained therein so as to control air flow to conduits 70 and 72, as well as to conduits 102 and 104.

The primary air timing valve cam 96 has a first cam surface 106, which engages the cam follower 98, and a second cam surface 108, which serves as a pig valve actuating cam. In this respect, a conventional pig valve 110 is utilized such as a Trojan model 75 manufactured by Ritchie Industries, Inc. of Conrad, Iowa. Such an automatic pig drinking valve is modified to operate as a lever operated vent to the atmosphere, is positioned as illustrated so as to be operable in response to movement of the primary air timing valve cam 96. One example of such a pig valve is disclosed in U.S. Pat. No. 3,646,955 to Olde. Specifically, the pig valve 110 is actuated by a lever 112 which may be displaced sideways out of alignment with the longitudinal axis of the valve so as to cause the valve to vent to the atmosphere, and this sideways movement of the lever is effected by the movement of an abutting lever 114 integrally attached to a bell crank 116. The bell crank 116 is rotatably attached to the vehicle frame 12 by means of a bearing 118 and is rotatable within the bearing in response to the movement of a bell crank follower 120 which is in an abutting relationship with the primary air timing valve cam 96. The bell crank follower 120 is engageable with the second cam surface 108 so as to effect the aforedescribed rotation of the ball crank 116 within the bearing 118 so as to cause the abutting lever 114 to displace the pig valve lever 112, thereby venting the same to the atmosphere.

The pig valve 110 is in communication with the conduits 102, 104 through a branch conduit 122 and serves to release exhaust air pressure contained in a pressure equalization transfer—midstroke/venting—pumped pressure transfer manifold 124, the purpose of which will be subsequently described. In this connection, exhaust air from the primary double-acting actuating cylinder 28 may at selective times be either vented to the atmosphere, through the operation of the pig valve 110, or to the low pressure compressed air tank 26, depending on the positioning of the primary air timing valve cam 96. As such, it can be appreciated that the low pressure compressed air tank 26 receives its entire supply of compressed air from the primary air timing valve 60, such compressed air supply comprising the exhaust air being ejected from the primary double-acting actuating cylinder 28.

A one-way check valve 126 is provided in the transfer manifold 124 whereby exhaust air may be directed from the air timing valve 60 into the low pressure compressed air tank 26 but may not flow backward from the tank towards the air timing valve. Effectively then, the low pressure compressed air tank 26 serves as a collection and storage means for exhaust air being admitted from the actuating cylinder 28, such exhaust air then being suppliable to the secondary air timing valve 30 by means of a pressure hose or conduit 128. A pressure gauge 130 is provided in the conduit 128 so as to provide an indication of the air pressure being supplied to the secondary air timing valve 30, and a pressure relief valve 132 is also provided therein in case the pressure within the conduit becomes excessive to the point of danger of injury to an operator or damage to the vehicle 10.

The secondary air timing valve 30 is also a spool-type directional valve having four-way operation and is provided with a pair of conduits 134, 136 which alternately direct compressed air to and from the secondary double-acting actuating cylinder 24. Additionally, a pair of conduits 138, 140 exhaust directly to the atmosphere and are provided respectively with mufflers 142, 144.

The secondary actuating cylinder 24 is of a larger construction than the primary actuating cylinder 28 and includes a piston 146 positioned within a cylinder housing 148 and being operably attached to a second crank pin or ball joint 150 by means of a connecting rod 152. The crank pin 150 is fixedly attached to a second crank 154 which, along with the first crank 82, is fixedly attached to the main drive gear shaft 90. The secondary actuating cylinder 24 has spaces 156, 158 positioned on respective sides of the piston 146, these spaces being respectively in communication with the conduits 134, 136. As such, both the primary actuating cylinder 28 and the secondary actuating cylinder 24 are drivingly engaged with the main drive gear shaft 90 so as to effect a rotation thereof in response to the reciprocable movement of the pistons 76, 146, within the respective actuating cylinders. Since the rotating movement of the cranks 82, 154 results in some oscillatory movement of the actuating cylinders 28, 24, respectively, each of the actuating cylinders are pivotally attached to the vehicle frame 12. In this connection, the actuating cylinder 28 is attached to the vehicle frame 12 about a pivotal connection 160, and the actuating cylinder 24 is attached to the vehicle frame by means of a pivotal connection 162.

Similar to the operation of the primary air timing valve 60, the secondary air timing valve 30 is likewise cam operated by means of a secondary air timing valve cam 36 which is fixedly attached and rotatable with the main drive gear shaft 90. The secondary air timing valve cam 36 is provided with a cam surface 166 against which a cam follower 34 is engageable, such cam follower being fixedly attached to a spool shaft 32 which is reciprocable within the secondary air timing valve 30 so as to control the flow of air through the conduits 134, 136, 138 and 140.

A better understanding of the pneumatic drive system illustrated in FIG. 4 can be ascertained through a discussion of the operation thereof. In this connection, compressed air contained in the high pressure compressed air tank 44 flows therefrom through faucet valve 54 and thence through the manifold or conduit 56 to the regulator 58. In flowing through the regulator 58, the air pressure is regulated as to a desired pressure selected by the vehicle operator. In this respect, regulation of the pressure is afforded by observing the pressure of the air contained in the tank 44 through viewing the pressure gauge 62 and by adjusting the regulator 58 so as to obtain a desired outlet pressure therefrom as indicated by the regulated air pressure gauge 64. The regulated pressure should not be allowed to exceed the rated pressure capacity of the primary double-acting actuating cylinder 28, the primary air timing valve 60, the on-off valve 68 or the conduits connecting them. However, should the regulated pressure somehow be allowed to exceed the rated pressure capacity of any of these parts, the safety release valve 66, which is installed between the regulator 58 and the on-off valve 68, will serve to release the excess air pressure thereby preventing any damage to the system or injury to a vehicle operator. In this connection, the pressure relief valve 66 should be set above the rated pressure of the primary actuating cylinder 28.

With further reference to FIG. 4, it can be seen that the regulated pressure compressed air is conducted from the regulator 58 through the on-off valve 68, which normally will be a three-way valve designed to vent downstream air to the atmosphere when in an off position, into the primary air timing valve 60. As aforedescribed, the primary air timing valve 60 is a four-way spool valve having tapped exhaust ports for pipe fittings with a closed center position. The timing valve 60 is cam operated utilizing a return spring and is designed to control the flow of compressed air to and from the actuating cylinder 28. A first pair of conduits 70, 72 are provided for communicating the air timing valve 60 with the primary actuating cylinder 28 and, with respect to the positioning of the parts shown in FIG. 4, it can be appreciated that a supply of compressed air provided through the conduit 70 will tend to pressurize the space 84 defined by the cylinder housing 74 and the piston 76, thereby to effect a movement of the piston and associated connecting rod 78 in a direction towards the crank pin 80. At any given time in operation, one of the two conduits 70, 72 is supplying a path for regulated air pressure to move the cylinder piston 76, while at the same time the other conduit is providing a path for exhaust air or air that has already been used against the piston, to provide motive power. As such then, during a supplying of compressed air through the conduit 70, the conduit 72 provides an open path for air contained in the space 86 to flow outwardly therefrom and into the air timing valve 60. As is then apparent, both conduits 70, 72 can never supply motive air pressure to the actuating cylinder 28 at the same time nor can they carry exhaust air at the same time, i.e., each conduit connecting a port of the actuating cylinder to a port of the timing valve 60 will either be provided a path for the regulated (motive air pressure) or a path for exhaust air pressure.

As shown then, a pressurization of the space 84 with a concurrent exhausting of the space 86 will effect a rotatable movement of the crank 82, since the connecting rod 78 is rotatably attached to the crank pin 80 which in turn is fixedly attached to the crank. The crank 82, as illustrated in FIG. 4, is at its point of rotation referred to as dead center and it is at this point that the air timing valve 60 acts to change the duties being performed by the conduits 70, 72 from pressure to exhaust for the one and from exhaust to pressure for the other, so that the actuating cylinder 28 alternately pushes and pulls to thereby rotate the crank 82. The double-acting actuating cylinder 28 is of a conventional construction and can be purchased from industrial supply houses and some bearing supply stores.

Continuing with the discussion of the operation, it can be seen that a rotation of the crank 82, which is fixedly attached to the main drive gear shaft 90, effects a similar rotation of the primary air timing valve cam 96. In that the cam surface 106 is in operable engagement with the cam follower 98, a reciprocable movement is translated therefrom to the spool shaft 100 thereby to cause the positioning of spool valves contained within the air timing valve 60 so as to control the exhaust and pressurization functions of the conduits 70, 72. As a part of this controlled operation, the exhaust air being delivered to the air timing valve 60 by either of the conduits 70, 72 is directed outwardly therefrom through one or the other of the conduits 102, 104 and into the pressure equalization transfer-midstroke/venting-pumped pressure transfer manifold 124, either to be directed to the atmosphere through the pig value 110 or to the low pressure compressed air tank 26.

At this point of discussion, it should be pointed out that the transfer of air from the high pressure compressed air tank 44 to the low pressure compressed air tank 26 is governed by basic fluid laws. In this regard, it can be seen that if the low pressure compressed air tank 26 contained air at a pressure of 10 PSI and the high pressure compressed air tank 44 contained air at 200 PSI, a pressure differential of 190 PSI would exist. As such, exhaust air at 200 PSI supplied from the actuating cylinder 28 through conduits and the air timing valve 60 will flow through the one-way check valve 126 into the low pressure compressed air tank. As this direct method of air transfer continues, it can be appreciated that when the pressure reaches say 100 PSI within the low pressure compressed air tank 26, it is no longer possible for the actuating cylinder 28 to deliver full force to the ball joint 80 because there now exists a pressure of two hundred PSI on one side of the piston 76 and 100 PSI on the other side of the piston, therefore robbing the actuating cylinder of half of its power potential. As such then, the back pressure as defined by the 100 PSI pressure contained in the low pressure compressed air tank 26 begins to result in lost power to the vehicle. However, this problem is overcome by the pneumatic drive system of the present invention by a realization of the fact that once an actuating cylinder reaches a certain speed of actuation while doing work (not running free with no load), a point of non-productivity is reached at which the increase of air pressure will not increase the power or speed generated by the actuating cylinder. This phenomenon is due to the fact that increasing pressure to a cylinder also increases the volume in cubic inches of air being forced into the cylinder, as well as the volume of the air exhausting from it. As such, a point is reached where an actuating cylinder just cannot vent and port this much air volume.

Continuing with the operation discussion, exhaust air flows from the air timing value 60 into the transfer manifold 124 toward the low pressure compressed air tank 26 thereby providing a pressure equalization in the manner above-described. This pressure equalization takes place during the first two inches of stroke (push or pull) of the actuating cylinder 28 after reaching a dead center position. The pig valve 110 is closed during this portion of the actuating cylinder 28 stroke so that the exhaust air has no other place to go during pressure equalization except into the low pressure compressed air tank 26. Once the flowing air passes the check valve 126, it is isolated from the actuating cylinder 28 and cannot return.

A midstroke venting is then provided and consists of a venting of a small portion of the exhaust air remaining inside the actuating cylinder 28 and in the manifold 124 at the beginning and during the center four inches or center half of both the push and pull strokes. An actuating cylinder is capable of delivering equal force at its connecting rod's point of connection with a crank pin during the entire length of a stroke; however, force and torque must be viewed separately. In this respect, it is to be understood that force delivered to a crank pin that is on dead center is useless in producing torque. For example, 1,000 pounds of force delivered to a crank pin on dead center will produce no torque, but when the crank pin has rotated to a point two inches to either side of an imaginary line between the center lines of a pivot pin and the crankshaft, 2,000 inch pounds of torque are produced. When the crank pin is four inches on either side of this line, a torque of 4,000 inch pounds is produced. This midstroke four inches of cylinder stroke is the portion capable of providing the most power to the wheels of a car. As such, midstroke venting of some exhaust air to the atmosphere to relieve back pressure during this critical portion of each power stroke is undertaken. Specifically, the pig valve 110 opens at selected times to vent the exhaust air to the atmosphere, while the check valve 126 prevents the air in the low pressure compressed air tank 26 from entering the manifold 124 where it would also be vented outwardly through the pig valve.

During the last two inches of each stroke (push and pull), the pig valve 110 will be closed. The actuating cylinder 28 then acts as a piston pump upon the remaining exhaust air inside the cylinder 74 and pumps this air through the manifold 124 into the low pressure compressed air tank 26. This pumping action does not diminish the torque at the crankshaft or main drive gear shaft 90, since the sheer leverage available to drive the actuating cylinder to pump air to the low pressure compressed air tank 26 during this last two inches of stroke is many times more than is required for the task. Also, there is regulated air pressure on the power stroke side of the piston 76 during this pumping action. As is apparent from the schematic, the pig valve 110 is timed to operate through the provision of a pig valve actuating cam surface 108 provided on the primary air timing valve cam 96. In this respect, the surface 108 engages the follower 120 so as to rotate the bell crank 116 within the bearing 118, thereby causing a movement of the lever 114 against the pig valve lever 112 so as to vent the same to the atmosphere. The pig valve 110 typically should be a high pressure pig drinking valve which has its flow metering orifice drilled out as large as possible so as to maximize air flow therethrough. A two-way spool valve (cam operated) can be utilized to operate just as effectively as the pig valve 110. In other words, a valve similar to the air timing valve 60 might be utilized except only a two-way valve would be required.

The secondary double-acting actuating cylinder 24 is next in line to use the same air already used in the actuating cylinder 28, and as illustrated in FIG. 4, the actuating cylinder 24 is in its midstroke position wherein crank pin or ball joint 150 is at a 90° or maximum torque position compared to actuating cylinder 28 located at a dead center stroke position. Effectively, an analogous operation is performed whereby compressed air contained in the low pressure compressed tank 26 is utilized to operate a second double-acting actuating cylinder 24 in the same manner as aforedescribed. In this respect, the compressed air contained in the low pressure compressed air tank 26 is directed through a conduit 128 to a secondary air timing valve 30 for use in operating the secondary double-acting actuating cylinder 24. In the event that too much air pressure is delivered to the air timing valve 30, a pressure relief valve 132 will vent the excess air pressure to the atmosphere. A selective delivering of the pressurized air to the actuating cylinder 24 is effected through the use of a secondary air timing valve cam 36 fixedly attached to the drive shaft 90 and being rotatable therewith, such secondary cam having a cam surface 166 operably engaged with a cam follower 34. The cam follower 34 is fixedly attached to the spool shaft 32 of the secondary air timing valve 30 and effects a reciprocation of the shaft within the timing valve so as to selectively direct air to or from spaces 156, 158 contained within the actuating cylinder 24. As such, a secondary driving force is imparted through the crank 154 to the crankshaft 90, such secondary driving force being in conjunction with a primary driving force provided through crank 82, thereby effecting a rotatable movement of the main drive gear 22. The main drive gear 22 is drivingly meshed with the axle gear 52 so as to thereby impart a driving force to the drive axle 46 and the drive wheels 14 associated therewith. As such, the basic operation of the pneumatic system illustrated in FIG. 4 has been described.

Figure 5:
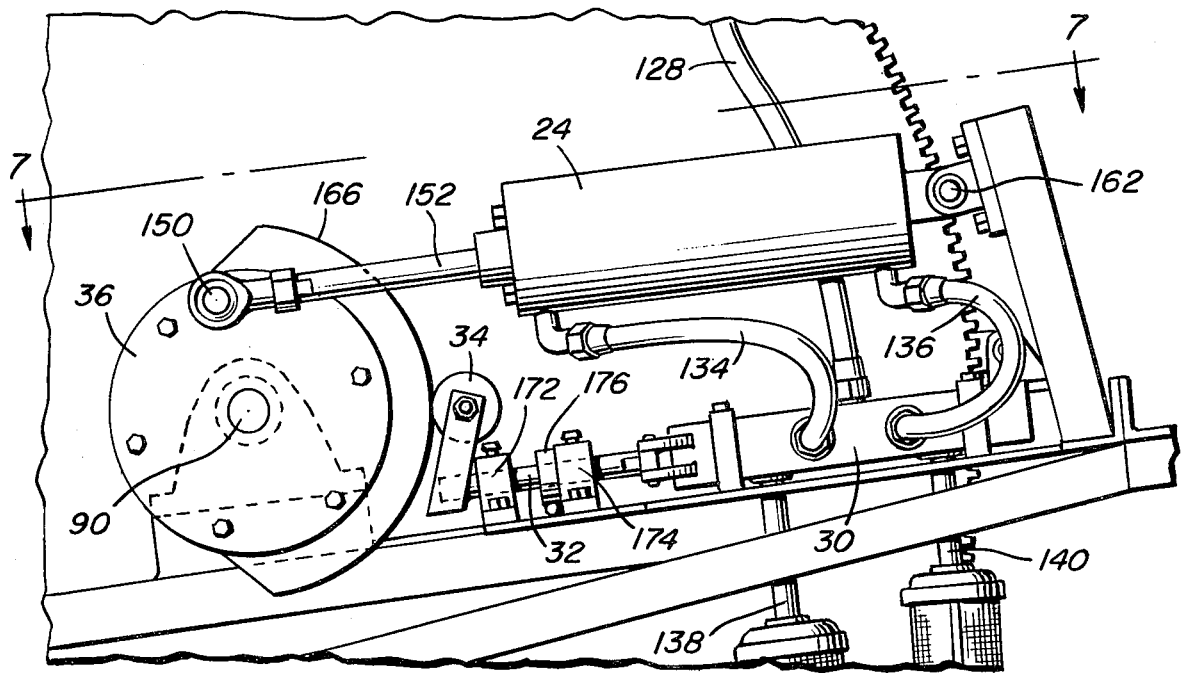
FIG. 5 is a detailed structural view of a second actuating cylinder which is operated by exhaust air supplied by a first actuating cylinder.

FIGS. 5-8 illustrate constructional details relating to the proper positioning and attachment of several of the described parts. In this connection, FIG. 5 illustrates the secondary air timing valve 30 and the conduits 134, 136 associated therewith which communicates with the secondary actuating cylinder 24. Further, the exhaust conduits 138, 140 are shown operably connected to the air timing valve 30. FIG. 5 also clearly illustrates the shape of the secondary air timing valve cam 36 which has a cam surface 166 engageable with the cam follower 34. In that the spool shaft 32 is spring biased in a direction towards the main drive gear shaft 90, it can be appreciated that the cam follower 34 will at all times be in engagement with the cam 36 and depending upon the positioning of the cam, the shaft 32 will be caused to reciprocate within the air timing valve 30 so as to effect the desired exhaust or pressurization of the respective chambers 156, 158 contained within the actuating cylinder 24. Further illustrated in this figure is the use of a bearing supports 172, 174 through which the spool shaft 32 reciprocally moves, while a sleeve 176 may be provided on the shaft to limit the movement thereof between the bearing supports. Also to be understood with reference to this figure is the fact that a rotatable movement of the cam 36 results in a pivotal movement of the actuating cylinder 24 about the pivotal connection 162. This is true since the connecting rod 152 is rotatably attached to the crank pin 150 and must follow the arcuate movement thereof which results in an oscillatory movement of the actuating cylinder 24. Lastly, the manifold conduit 128 is shown operably connected to the air timing valve 30.

Figure 6:
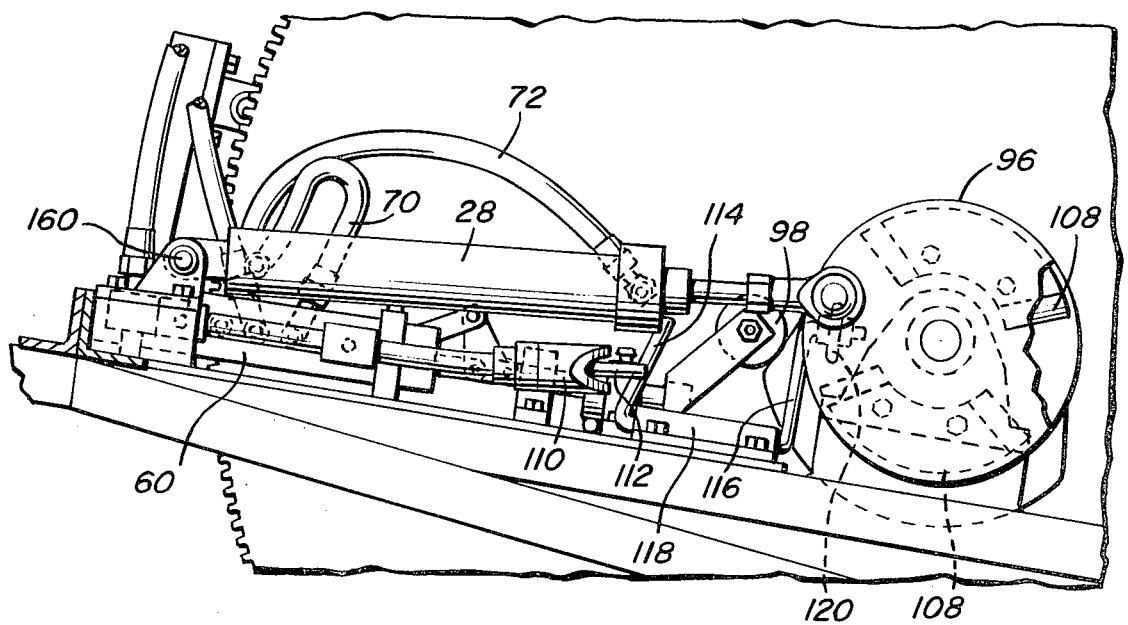
FIG. 6 is a detailed structural view of the first actuating cylinder and structure associated therewith.

FIG. 6 illustrates some of the structural connection details of the primary actuating cylinder 28 which is pivotable about connection point 160. In this connection, the primary air timing valve cam 96 is shown and includes a cutaway portion designed to more effectively illustrate the pig valve operating cam surface 108. In this regard, the pig valve 110 is clearly illustrated as including a pig valve lever 112, the displacement of which in a sidewise direction will cause a venting of the pig valve to the atmosphere, such lever being sidewise moveable through the action of the abutting lever 114. Abutting lever 114 effectively is an integral part of the bell crank 116 rotatably mounted within the bearing 118. As can be clearly ascertained by reference to this figure, the bell crank cam follower 120 is engageable with either of the two pig valve operating cam surfaces 108 so as to effect a desired rotation of the bell crank 116 thereby to cause the abutting lever 114 to displace the pig valve lever 112. Also illustrated with respect to this figure is the cam follower 98 which serves to operate the air timing valve 60, and thus the air supply conduits 70, 72.

Figure 7:
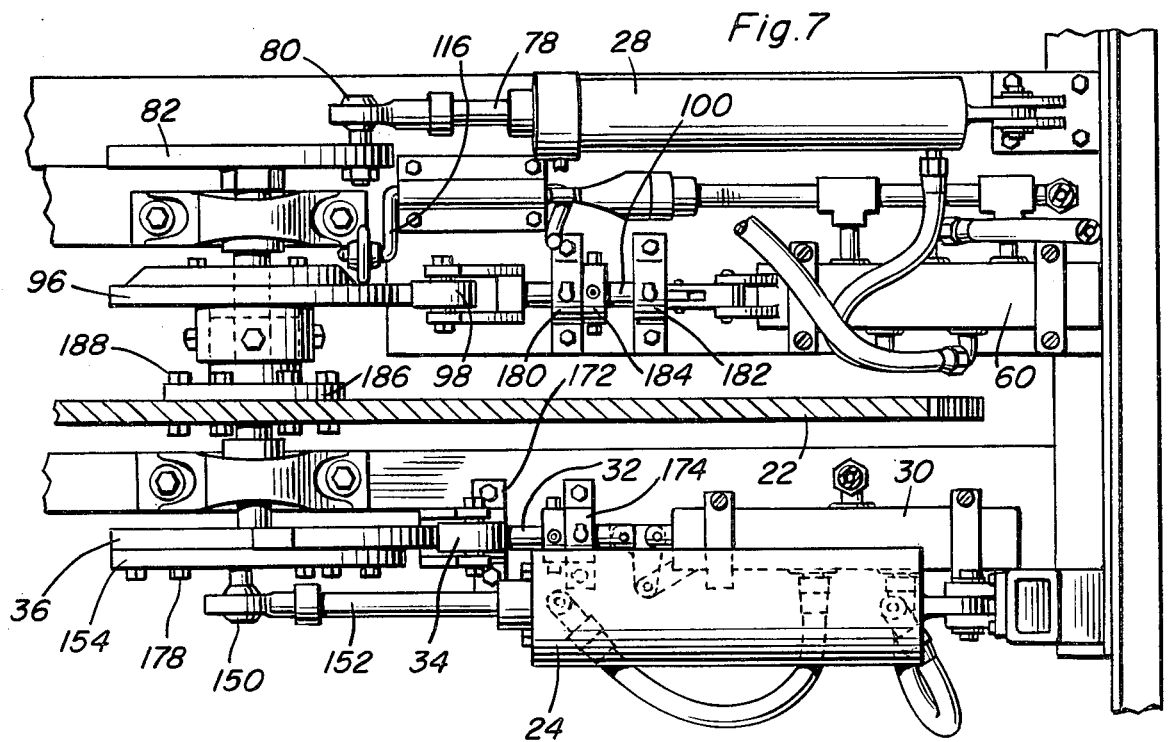
FIG. 7 is a partial top plan view taken along the line 7—7 of FIG. 5 looking in the direction of the arrows and illustrating some of the detailed structure associated with the first and second actuating cylinders.

FIG. 7 is a top plan view further illustrating a possible structural layout of the parts above-described. In this connection, the main drive gear 22 is shown centrally disposed between the primary actuating cylinder 28 and the secondary actuating cylinder 24. With respect to this possible layout, it can be seen that the primary actuating cylinder 28 is connected by means of connecting rod 78 to the crank 82 while the secondary actuating cylinder 24 is connected by means of connecting rod 152 to crank 154. Also illustrated in this figure is the fact that the crank 154 and the cam 36 might be of a combined construction, i.e., they might be directly attached to each other. This, of course, leads to the conclusion that the crank 154 and cam 36 could be of an integral construction, thus obviating the need for connection means such as bolts 178 therebetween. Similarly, the cam 96 might be integrally constructed with the crank 82, although a different layout might be required so as to permit a proper funtioning of the bell crank 116 with respect to its engagement with the cam surface 108. While FIG. 5 illustrates the use of bearing supports 172, 174 in conjunction with the spool shaft 32 associated with the air timing valve 30, this figure illustrates that similar bearing supports 180, 182 might be utilized to support the spool shaft 100 associated with the air timing valve 60. Similarly, a sleeve 184 might be provided on the spool shaft 100 to limit the movement thereof between the bearing supports 180, 182. Main drive gear 22 is further illustrated in this view as being fixedly attached to the drive shaft 90 by means of a flange 186 which is an integral part of the drive shaft and which is connectible to the main drive gear through the use of some connection means, such as bolts 188. Accordingly, the drive gear 22 may be easily removed from the shaft 90 and replaced thereby with drive gears of different ratios or with a duplicate drive gear if desired.

Figure 8:
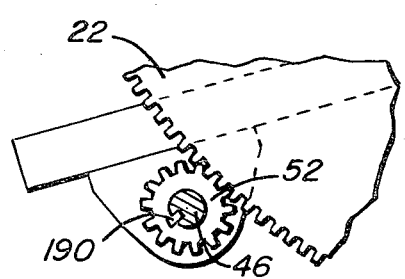
FIG. 8 is a detailed structural view of the connection between the main drive gear and the axle gear operably associated therewith.

FIG. 8 has been provided solely to illustrate the driving engagement of the main drive gear 22 with the axle gear 52 so as to effect a rotation of the axle shaft 46. As illustrated, the axle gear 52 is separably attached to the drive axle 46 by means of a key 190 which serves to frictionally, lockingly engage the axle gear to the drive axle. Further, this figure serves to illustrate the fact that regardless of the size of the main drive gear 22 in relation to the axle gear 52, the gear teeth on both can be appropriately designed to effect a proper meshing therebetween.

It is to be understood that the preferred embodiment of the present invention as illustrated in FIGS. 1 through 8 is complete to the extent of illustrating the operation of the pneumatic system designed for propelling the air vehicle 10, as well as to illustrate one structural configuration whereby the parts might be positioned relative to each other in an operable manner. However, some discussion must also be provided with respect to specific design features not illustrated in the figures provided herewith. While much leeway is available in designing the air-driven vehicle 10. the preferred embodiment will be herein described with respect to a particular design to thereby facilitate a better understanding of the pneumatic system comprising the present invention. Specifically, it is desirable to start with a gear ratio of 270 teeth to 24 teeth, i.e., the main drive gear 22 should have 270 individual teeth while the axle drive gear 52 should have 24 teeth for engagement therewith. Ideally, it is desirable also to use 24" diameter tires to facilitate an easy calculation of the distance moved by the air-driven vehicle 10 down the road, and if 24" diameter tires are not utilized, it is desirable to add to or substract from the number of teeth on the axle drive gear 52 so as to maintain proper distance calculations. The preferred embodiment also utilizes a 2½" bore, 8" stroke, primary actuating cylinder 28, along with a 4" crank throw associated with the crank 82. Secondary actuating cylinder 24 is lager in diameter, i.e., has a 4" bore, but also utilizes an 8" stroke.

The maximum air pressure provided to the primary actuating cylinder 28 is 250 PSI, while the low pressure compressed air tank 26 would carry a maximum pressure of 85 PSI, thus giving the secondary actuating cylinder 24 an operating pressure of approximately 80 PSI due to pressure drop within the system. The larger bore of the secondary actuating cylinder 24 enables it to deliver a force at the crank 154 which is nearly equal to the force provided by the primary actuating cylinder 28. As such, the secondary actuating cylinder 24 effectively doubles the power of the pneumatic engine without using any additional air to do so. A two-cylinder car can be expected to obtain a little more than twice the speed obtained on one cylinder. A three cylinder car could then be expected to obtain three times the speed of a single cylinder car. Similarly, a four cylinder car can be expected to obtain about nine miles per hour less than four times the speed of a single cylinder car. On the above figures for a two, three or four cylinder car, it should be noted that a primary actuating cylinder pressure of 250 PSI and all other factors such as gear ratio and tire diameter are the same. Further, a car weight increase of 50 pounds for each additional actuating cylinder can be expected. For example, a four actuating cylinder car would weigh approximately 150 pounds more than a single actuating cylinder car due to the weight of the actuating cylinders, the additional low pressure compressed air tanks 26, and their related hoses and valves. As such, an increase in power and speed is easily obtained without using any additional air per mile down a road.

While a five or six cylinder pneumatic engine could easily be built, no speed or power figures are available. However, a six cylinder engine could be a radial engine with one timing cam and one pig valve cam. The first cylinder migh possibly be a 2" bore rated at 500 PSI with 450 PSI used for a maximum pressure. The six cylinder could then possibly be a 6" bore with other cylinder sizes used between the first and sixth actuating cylinders. A radial engine is envisionable wherein all cylinder rod ends would be connected to one common crank pin having a 4" crank throw. Only one timing cam and one pig valve cam would be required. On a three cylinder engine, the primary cylinder pig valve could port air during its stroke to a lower pressure compressed air tank that supplies air to a third actuating cylinder instead of venting this air to the atmosphere, while the number two cylinder pig valve would continue to vent to the atmosphere. On a four cylinder engine, the primary cylinder pig valve would port to the number three cylinder pressure tank, while the number two cylinder pig valve would port to the number four cylinder pressure tank and the number three cylinder pig valve would then vent to the atmosphere.

Because of increased power expected with respect to three and four cylinder cars, gear ratio changes to effect even better air mileage could be made. For example, a 21 tooth axle drive gear could be used on a three cylinder car while a 19 tooth axle drive gear could be used on a four cylinder car. Less drive teeth than this would be inefficient in the transmission of power. For the purposes of town driving, there should be provided at least 1500 cubic feet of air storage capacity so as to attain a respectable distance before exhaustion of the air supply. 1500 cubic feet of air could be four "T" sized compressed air tanks plus a scuba tank. These tanks can be obtained in any practical length.

The foregoing discussion has related somewhat to specific dimensional relationships between respective parts as well as to some discussion relating to desired operating pressures, etc. However, optimum dimensional relationships for the parts of the invention are deemed readily apparent and obvious to one skilled in the art, and all equivalent relationships to those illustrated in the drawings and described in the specification are intended to be encompassed by the invention, subject only to limitations specifically appearing in the claims. As such, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a fluid power operated motor system, including at least one pair of double-acting piston devices respectively having piston elements separating opposed pressure chambers, and a storage source of pressurized fluid, the improvement comprising first valve means operatively connecting said storage source to one of the piston devices for reciprocation of the piston element thereof in response to alternate pressurization and exhaust of said opposed chambers, pressure accumulating means connected to the first valve means for receiving the fluid exhausted from one of the opposed chambers of said one of the piston devices, second valve means operatively connecting said pressure accumulating means to the other of the piston devices independently of the storage source for reciprocation of the piston element thereof in out-of-phase relation to the piston element of said one of the piston devices, mechanical power transmitting means drivingly interconnected with the piston elements in said out-of-phase relationship, valve operating means driven by the power transmitting means for limiting transfer of fluid exhausted from said one of the piston devices to the pressure accumulating means during spaced intervals of time, and vent means actuated by the valve operating means for venting the fluid exhausted between said spaced intervals of time.

2. The combination of claim 1 wherein said storage source is a rechargeable, compressed air tank.

3. The combination of claim 1 wherein said power transmitting means includes a vehicle propelling drive train.

4. In a fluid power operated motor system, including at least one pair of double-acting piston devices respectively having piston elements and a storage source of pressurized fluid, the improvement comprising, pressure accumulating means operatively connected between said piston devices for transfer of fluid exhausted from one of the piston devices to the other of the piston devices, valve means connected to said piston devices for pressurization of said one of the piston devices and limiting said transfer of fluid exhausted therefrom to spaced intervals of time during which the storage source and the pressure accumulating means are substantially equalized in pressure, and vent means for venting the fluid exhausted from said one of the piston devices between said spaced intervals of time.

5. The improvement as defined in claim 4 including mechanical power transmitting means operatively connected to the piston elements of the piston devices in 90° out-of-phase relationship to each other for actuation of the valve means and the vent means in response to movement of said piston elements through a predetermined stroke.

* * * * *